(No Model.)
J. T. ROBINSON & D. M. SMITH.
PAPER GROOVING MACHINE.
No. 573,705. Patented Dec. 22, 1896.
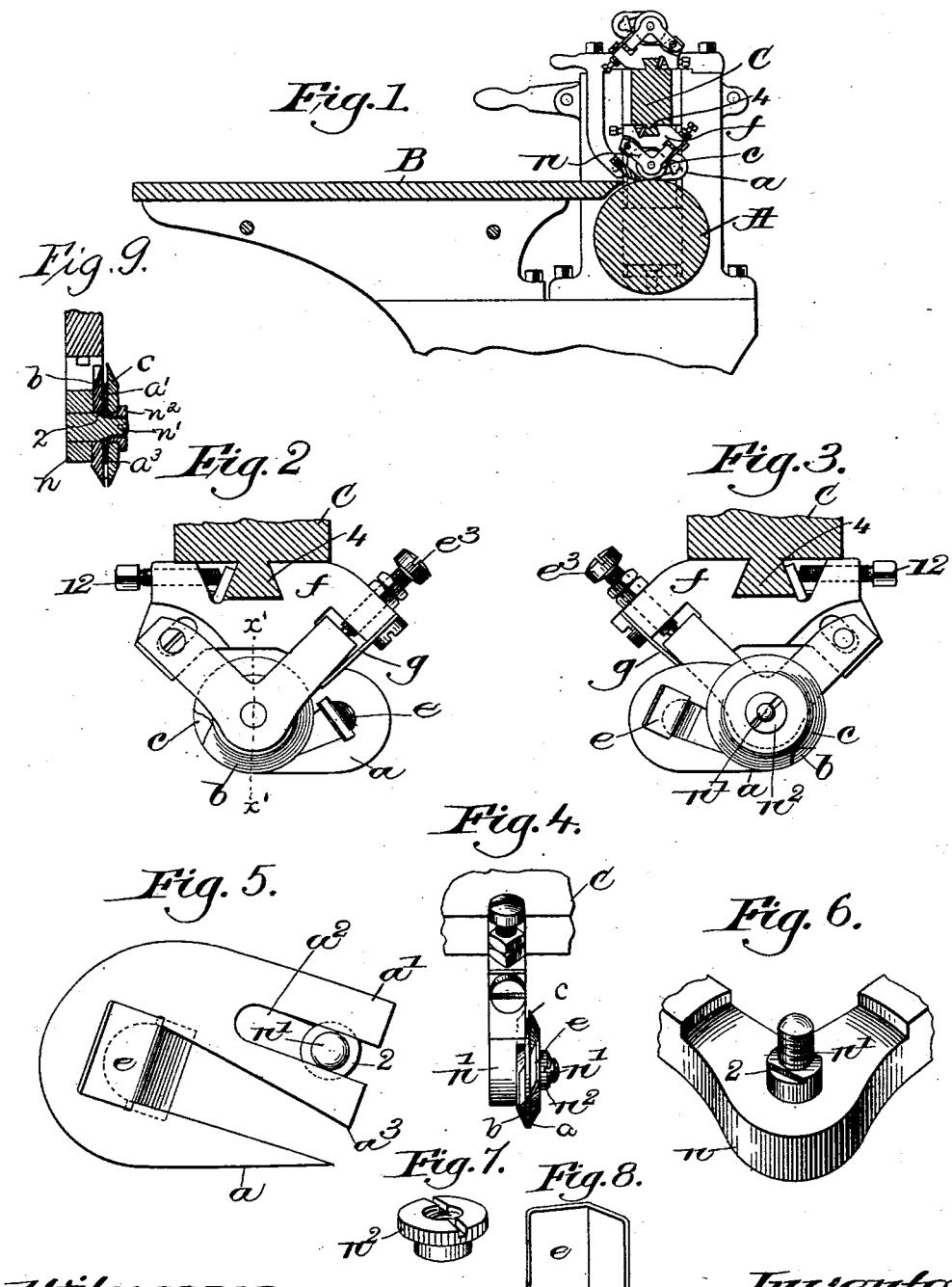

UNITED STATES PATENT OFFICE.

JOHN T. ROBINSON, OF HYDE PARK, AND DESBROW M. SMITH, OF BOSTON, MASSACHUSETTS, ASSIGNORS TO J. T. ROBINSON & CO., OF HYDE PARK, MASSACHUSETTS.

PAPER-GROOVING MACHINE.

SPECIFICATION forming part of Letters Patent No. 573,705, dated December 22, 1896.

Application filed August 13, 1896. Serial No. 602,643. (No model.)

*To all whom it may concern:*

Be it known that we, JOHN T. ROBINSON, of Hyde Park, in the county of Norfolk, and DESBROW M. SMITH, of Boston, in the county of Suffolk and State of Massachusetts, have invented an Improvement in Paper-Grooving Machines, of which the following description, in connection with the accompanying drawings, is a specification, like letters and figures on the drawings representing like parts.

Prior to this invention it has been customary to groove paper-board by the employment of two circular cutting-disks, each supported independently, and the said supports have been made adjustable one with relation to the other, and an adjustable plow or cutter has been placed between the disks to remove the material between the cuts made by the disks, and so also two cutting-disks have been held on a hollow sleeve-nut, mounted on a removable stud between the forks of an arm, and to adjust the distance of one disk from the other it has been necessary to remove the stud from the forked arm and then to remove a nut from the sleeve, take off a disk, and by the application of washers to the said sleeve, they occupying a position between said disks, to locate the latter at the proper distance apart. In both these instances considerable time is required to effect a change in the width of the groove to be made in the paper-board. We have aimed to simplify this cutting apparatus and have done so, whereby a change in the width of the groove may be readily and quickly made. To accomplish this, we have placed the two disk cutters side by side on a threaded stud fixed to an extension from one side of an adjustable yoke, said disks being kept on said stud by means of a nut screwed onto its end, and to adapt the apparatus to different widths of groove we have provided a series of plows of different thicknesses, and have so made them that by merely slackening the nut a plow of one thickness may be removed and one of another thickness be substituted, when the nut will be again tightened. Our plow is also adapted to turn the uplifted strip of paper to be moved by it aside in one direction, we having applied to said plow a directing plate or device. Our plow is further so shaped that a part of it, immediately above its point which enters the paper, is made to serve the purpose of a clearer to remove from the space between the two disks the strip of paper lifted by the plow, which strip but for the clearer would have a tendency to be wound about the stud on which the disks turn. In this way it will be seen that our plow and clearer are in one and the same piece, and this combined plow and clearer is made of a single piece of sheet metal which is slotted to be readily slid into operative position between the disks and be held there by merely tightening the nut employed to hold the disks in place.

Figure 1 shows in section a part of a paper-grooving machine with our improved grooving attachment or device applied thereto. Fig. 2 shows our attachment enlarged and part of the beam to which it is secured for use; Fig. 3, a view of the opposite side of the attachment shown in Fig. 2; Fig. 4, an edge view looking at Fig. 3 from the left. Fig. 5 shows the combined plow and clearer detached and yet further enlarged and the directing device carried by it. Fig. 6 shows a portion of the yoke and its stud on which the cutting-disks are mounted to turn. Fig. 7 shows the nut detached. Fig. 8 shows the directing-plate detached. Fig. 9 is a section in the line $x'$, Fig. 2.

The feed-roller A, table B, and bar C, having the dovetailed projection or track, the clamping-block $f$, having an adjusting-screw $e^3$ and a spring $g$, and the yoke $n$ and clamp-holding screw 12 are and may be all as in United States Patent No. 273,394, dated May 6, 1883, so need not be herein further described. The yoke $n$ in this our invention is provided with a fixed stud $n'$, which is extended from one side of the yoke, the exposed outer end of the stud being threaded to receive in it a nut $n^2$. This stud, as shown, presents two different diameters, (see Fig. 6,) and at the junction of the two diameters is a guide 2 for the plow $a$, said guide being formed by slabbing off a portion of the larger diameter of the stud. The stud, being fixed to the yoke, always presents a perfectly rigid bearing for the circular cutting-disks $b\ c$, which are placed on the studs. The nut $n^2$ is made as a sleeve, and its outer diameter is substantially the same as the larger diameter of the stud, the stud thus constituting a bearing for the one disk and the hub for the other disk.

The plow $a$ has its shank extended backwardly, as at $a'$, and slotted, as at $a^2$, and one edge of said shank at one side of said slot is made to constitute a clearer $a^3$, its acting end being located just above the point of the plow, the point and clearer occupying a position between the cutting-disks, the slot $a^2$ of the plow-shank embracing the slabbed-off portion 2 and being prevented thereby from turning on the stud, yet being left free to be readily applied to or to be removed from said stud, as the width of the groove to be made demands, for, as stated, each apparatus is provided with plows just alike only as to their thickness from side to side, and to change the width of a groove it is only necessary to slacken or loosen the nut $n^2$, pull out the plow, and put in one of the desired thickness.

At the inner end of the space between the plow and the clearer we have applied a directing device $e$, it being made as a piece of thin sheet-steel plate fitting notches in the plow, (see Fig. 8,) said device being slipped into the space, it constituting a diagonally-placed bridge against which the strip of paper lifted by the plow and acted upon by the clearer will strike and be turned aside always in the same direction and place.

Both disks may be readily removed from the fixed stud of the yoke by simply removing the nut $n^2$.

Having described our invention, what we claim as new, and desire to secure by Letters Patent, is—

1. In a paper-grooving attachment, a yoke provided with a threaded stud extended from one side of the same, a nut on said stud, two cutting-disks held on said stud by said nut and a plow having its shank placed between said disks and guided and supported by said stud, substantially as described.

2. In a paper-grooving attachment, a yoke provided with a threaded stud extended from one side of the same, and slabbed as at $a^2$, a nut on said stud, two cutting-disks held on said stud by said nut, and a plow placed between said disks and having its shank slotted to embrace said stud, one part of said shank serving the purpose of a clearer, substantially as described.

3. In a paper-grooving attachment, a yoke provided with a threaded stud extended from one side of the same, a nut on said stud, two cutting-disks held on said stud by said nut, and a plow having its shank placed between said disks and embracing said stud, and a directing device carried by said plow, to operate, substantially as described.

4. The herein-described plow having a backwardly-turned integral shank, one corner of which is located just above the point of the plow to act as a clearer, substantially as described.

5. In a paper-grooving attachment, a yoke having a fixed threaded stud differing in diameter at its inner and outer end and extended from one side of said yoke leaving its threaded end exposed, a threaded nut having a sleeve and screwed on said stud, and two cutting-disks, one of which turns on said stud and the other on the sleeve of said nut, the removal of the said nut permitting the removal of said disks, substantially as described.

6. In a paper-grooving attachment, a yoke having a fixed threaded stud differing in diameter at its inner and outer end and extended from one side of said yoke leaving its threaded end exposed, a threaded nut having a sleeve of substantially the diameter of the base of said stud, and two cutting-disks, one of which turns on said stud and the other on the sleeve of said nut, the removal of the said nut permitting the removal of said disks, substantially as described.

7. In a paper-grooving attachment, a yoke provided with an integral threaded stud extended from one side of the same, two cutting-disks surrounding said stud loosely, a nut to confine said disks on said stud, and a plow having its backwardly-turned integral end formed to embrace said stud between said disks, one corner of said shank lying above the point of said plow and serving as a clearer, substantially as described.

8. In a paper-grooving attachment, a yoke, a stud carried by it, and two cutting-disks mounted side by side on said stud, combined with a plow composed of a U-shaped piece of metal, one arm of the plow presenting a point, the other arm constituting the shank of the plow being slotted to embrace said stud between said cutters, the corner of the shank being located just above the point of the plow to act as a clearer, and means to clamp the plow in adjusted position, substantially as described.

In testimony whereof we have signed our names to this specification in the presence of two subscribing witnesses.

JOHN T. ROBINSON.
DESBROW M. SMITH.

Witnesses:
GEO. W. GREGORY,
MARGARET A. DUNN.